United States Patent
Lubelsky et al.

(10) Patent No.: US 9,936,163 B1
(45) Date of Patent: Apr. 3, 2018

(54) SYSTEM AND METHOD FOR MIRROR UTILIZATION IN MEETING ROOMS

(71) Applicant: Avaya Inc., Santa Clara, CA (US)

(72) Inventors: Eyal Lubelsky, Kiryat Ono (IL); Yoel Popovich, Hadera (IL); Ami Sanado, Kibutz Hahotrim (IL); Ilan Dayan, Gadera (IL); Azaria Cohen, Maale Levona (IL); Tamar Barzuza, Tel Aviv (IL)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/286,356

(22) Filed: Oct. 5, 2016

(51) Int. Cl.
| | |
|---|---|
| *H04N 7/14* | (2006.01) |
| *H04N 7/15* | (2006.01) |
| *H04N 5/232* | (2006.01) |
| *H04N 5/262* | (2006.01) |
| *H04N 5/265* | (2006.01) |
| *G06T 5/50* | (2006.01) |

(52) U.S. Cl.
CPC ............ *H04N 7/147* (2013.01); *G06T 5/50* (2013.01); *H04N 5/23238* (2013.01); *H04N 5/23296* (2013.01); *H04N 5/265* (2013.01); *H04N 5/2628* (2013.01); *H04N 7/142* (2013.01); *H04N 7/15* (2013.01); *G06T 2207/10012* (2013.01); *H04N 5/23219* (2013.01)

(58) Field of Classification Search
CPC ............ G06T 5/50; G06T 2207/10012; H04N 5/23219; H04N 5/23238; H04N 5/23296; H04N 5/2628; H04N 5/265; H04N 7/142; H04N 7/147; H04N 7/15

USPC .... 348/14.01–14.16; 370/259–271, 351–357
See application file for complete search history.

(56) References Cited

U.S. PATENT DOCUMENTS

| | | | | |
|---|---|---|---|---|
| 5,479,203 A | * | 12/1995 | Kawai | H04N 5/232 348/14.1 |
| 2002/0061767 A1 | * | 5/2002 | Sladen | H04M 1/0202 455/556.1 |
| 2002/0175990 A1 | * | 11/2002 | Martino | H04N 7/142 348/14.08 |
| 2004/0196359 A1 | | 10/2004 | Blackham | |
| 2004/0263611 A1 | * | 12/2004 | Cutler | H04N 7/142 348/36 |
| 2015/0172633 A1 | * | 6/2015 | Nobori | H04N 5/23238 348/36 |

OTHER PUBLICATIONS

"Hummingbird360TM Camera System," Remote Reality Corp., 2015, retrieved from http://www.remotereality.com/wp-content/uploads/datasheets/hummingbird.pdf, retrieved on May 25, 2017, 1 page.

* cited by examiner

*Primary Examiner* — Hemant Patel
(74) *Attorney, Agent, or Firm* — Sheridan Ross P.C.

(57) ABSTRACT

A video-enabled communication system that includes a processor, coupled with a camera, the camera acquiring an image of an object of interest during a video communication session and a computer readable medium, coupled with the processor, comprising instructions that cause the processor to select a reflected image of the object of interest for use in providing image information to a remote endpoint for display to another participant, wherein the reflected image is a reflection of the object of interest in a mirror having a line-of-sight to the camera.

20 Claims, 10 Drawing Sheets

SYSTEM AND METHOD FOR MIRROR UTILIZATION IN MEETING ROOMS

FIELD

The disclosure relates generally to video communication and particularly to image capture using reflection surfaces in video telecommunication.

BACKGROUND

A video conferencing endpoint traditionally captures a meeting room from a single view point, where a main Pan Tilt Zoom (PTZ) camera is located. A typical meeting revolves around a desk and is captured by the PTZ camera from one of the desk ends. This set up can be limited. For example, two participants performing a dialog can be seated in a way that will require one of them to turn his or her head away from the camera. The camera captures the participant from behind, and the remote participants lack his or her frontal view. This is a particular problem when he or she is speaking. Another example is when a presenter approaches a whiteboard or projection or TV screen to point to his presentation. The whiteboard or screen is often located behind the camera. The presenter, while positioned at the whiteboard or screen, will be entirely out of camera view.

Some videoconferencing solutions add another camera to the meeting room endpoint to obtain an additional point of view. In two-camera solutions, it is common practice to have one camera still and transmitting video while the other camera is moving and searching for a next optimal point of view. When the next optimal point of view is identified, the system switches to that camera for video transmission and the other camera is moved to search for the next optimal point of view. This is not only an expensive solution but also adds a long cable to the meeting room, which can complicate or obstruct participant movement.

SUMMARY

These and other needs are addressed by the various embodiments and configurations of the present disclosure.

A video-enabled communication system can include:

a processor, coupled with a camera, the camera acquiring an image of an object of interest during a video communication session; and a computer readable medium, coupled with the processor, comprising instructions that cause the processor to select a reflected image of the object of interest for use in providing image information to a remote endpoint for display to another participant.

The reflected image can be a reflection of the object of interest in a mirror having a line-of-sight to the camera.

The processor can control a pan, tilt and zoom of the camera to capture the reflected image or extract the reflected image from a common image captured by the camera, the common image including a non-reflected image of an object other than the object of interest The reflected image can be used as an input to generate a three-dimensional image of the object of interest, and the image information can include the three-dimensional image.

The processor can superimpose, on the reflected image, a second image of the object of interest to generate the three-dimensional image, and the reflected image and second image of the object of interest can be captured at a same time by the camera.

The processor can use the reflected image to correct image distortion in the image information.

The object of interest can be a participant, and the processor can use face detection and motion detection analysis of the reflected image to determine that the object of interest is an active speaker.

The image information can include the reflected image.

A video-enabled communication system can include a processor that selects the reflected image of the object of interest, from among multiple possible images that can be or have been captured by the camera, for provision to a remote endpoint for display to another participant, with the reflected image being a reflection of the object of interest in a mirror having a line-of-sight to the camera.

The mirror can be positioned transverse to an optical axis of the camera.

The processor can base the reflected image selection on information describing a local participant and/or context of the video communication session.

The processor, at a first time, can select a non-reflected image of object of interest captured by the camera for provision to the remote endpoint and, at a second time, the reflected image of the object of interest to provide to the remote endpoint.

The object of interest can be a local participant that, at the first time, faces the camera and, at the second time, faces the mirror.

The camera can be a wide angle and high resolution digital camera.

The non-reflected image and reflected image can be extracted, at different times, from image information captured by a field of view of the camera at common pan, tilt, and zoom settings.

The processor can control a pan, tilt, or zoom of the camera based on an electronic mirror map comprising one or more of a mirror location defined by set of spatial coordinates, a mirror type, mirror size, and angle of the mirror relative to an optical axis of the camera and wherein the object of interest is a presentation on a presentation surface.

The processor, at the first time, can substitute a selected image for the reflected image in the image information captured by the field of view of the camera.

The processor can upscale and/or enlarge the reflected image of the object of interest to resemble a size of the object of interest in a non-reflected image captured by the camera.

The object of interest can be an item on a table or desk, and the mirror can be positioned on a horizontal surface of the table or desk to reflect, for capture by the camera, the reflection of the item.

The present disclosure can provide a number of other advantages depending on the particular configuration. The system can introduce mirrors as additional low-cost and easy-to-install viewpoints of a meeting to enhance the experience of remote participants. The mirrors enable not only the maintenance of eye contact with a local participant and remote users as the local participant moves his or her head in different directions but also the ability to capture views of participants that are out of the direct field of view of the camera. Each mirror can perform as a view point of the meeting room, while being captured and analyzed by a single camera. The reflected image can be digitally cropped and zoomed using a high resolution (such as 4K to 8K pixel or MP) and wide view angle camera. Remote user experience can be enhanced by optimally capturing dialogs, a presenter on a screen, a presentation on a screen, a paper sketch on a desk, and more. The captured view can be streamed as a separate image in a frame of the layout provided to the various remote endpoints.

These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "biometric information" is any information that can be used in biometric verification to identify uniquely a selected person, including one or more distinguishing biological traits. Unique identifiers include, for example, fingerprints, hand geometry, a facial feature such as earlobe geometry, retina and his patterns, and the like, voice waves, DNA, and signatures. Facial recognition, for example, can be used to biometrically verify a selected person's identity.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "face detection" refers to an algorithm for detecting a face of a subject in a captured image by applying digital image processing techniques to image information (either still or video frame). Such algorithms include the Viola-Jones face detection algorithm (which uses Haar feature selection, integral image creation, Adaboost training, and cascading classifiers to effect face detection) and implementations thereof (such as the MATLAB and OpenCV implementations of the algorithm), KLT algorithm (which acquires numerous feature points by first scanning the face; these points then may be detected and tracked even when the face is tilted or turned away from the camera) and implementations thereof, and other techniques known to those of skill in the art.

The term "facial recognition" or "face recognition" refers to an algorithm for identifying a person's identity based on a detected facial image of the person by applying digital image processing techniques to image information (either still or video frame). One of the ways to do this is by comparing selected facial features from the image and a facial database. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. Template matching techniques applies a template to a set of salient facial features, providing a compressed face representation. Recognition algorithms can be divided into two main approaches, geometric, which looks at distinguishing features, or photometric, which is a statistical approach that distills an image into values and compares the values with templates to eliminate variances. Common recognition algorithms can use Principal Component Analysis using eigenfaces, Linear Discriminate Analysis, Elastic Bunch Graph Matching using the Fisherface algorithm, the Hidden Markov model, the Multilinear Subspace Learning using tensor representation, the neuronal motivated dynamic link matching, SVM, maximal rejection classifier ("MRC"), and other techniques known to those of skill in the art.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "mirror" refers to a reflective surface, such as a glass surface coated with a metal amalgam, that reflects an image. A mirror commonly reflects light in such a way that, for incident light in some range of wavelengths, the reflected light preserves many or most of the detailed physical characteristics of the original light. This is different from other light-reflecting objects that do not preserve much of the original wave signal other than color and diffuse reflected light. The most familiar type of mirror is the plane mirror, which has a flat screen surface. Curved mirrors (such as concave or convex) are also used, to produce magnified or diminished images or focus light or simply distort the reflected image. One-way mirrors (also called two-way mirrors) work by overwhelming dim transmitted light with bright reflected light. A true one-way mirror that actually allows light to be transmitted in one direction only without requiring external energy is not possible as it violates the second law of thermodynamics: The mirror can be semi-transparent, which passes a substantial portion of the light and reflects a substantial portion of the light.

The term "multipoint" conferencing unit refers to a device commonly used to bridge videoconferencing connections. The multipoint control unit can be an endpoint on a network that provides the capability for three or more endpoints and/or gateways to participate in a multipoint conference. The MCU includes a mandatory multipoint controller (MC) and optional multipoint processors (MPs).

The term "video" refers to any relevant digital visual sensory data or information, including utilizing captured still scenes, moving scenes, animated scenes etc., from multimedia, streaming media, interactive or still images etc.

The term "videoconferencing" refers to conduct of a videoconference (also known as a video conference or videoteleconference) by a set of telecommunication technologies which allow two or more locations to communicate by simultaneous two-way video and audio transmissions. It has also been called 'visual collaboration' and is a type of groupware. Videoconferencing differs from videophone calls in that it's designed to serve a conference or multiple locations rather than individuals.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
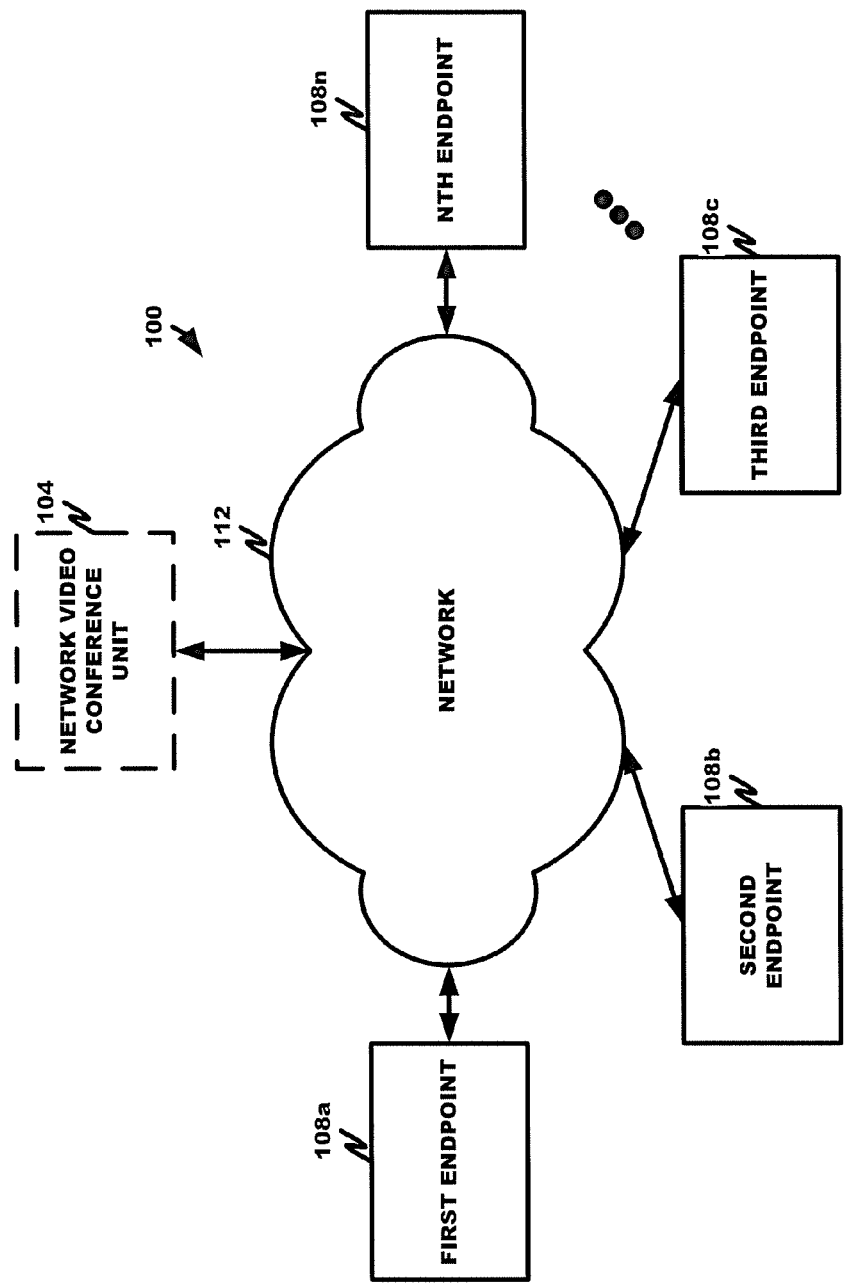
FIG. 1 is a block diagram depicting a system configuration according to an embodiment of the disclosure.

The conferencing system 100 of FIG. 1 generally includes an optional network video conference unit 104 and first, second, third, . . . nth endpoints 108a-m, interconnected by a network 112. While the first and second endpoints 108a,b are depicted, it is to be appreciated that more endpoints can be present and participating in the video conference. The conferencing system 100 can be a personal video conferencing system between two users communicating one-on-one or point-to-point (in which case no MCU is required), a group video conferencing system among three or more people, a mobile video conferencing system involving one or more mobile endpoints and can be a software only solution, hardware only solution, or combination of software and hardware solutions.

The optional network video conference unit 104 can be any network multipoint conferencing unit ("MCU") or video conferencing server ("VCS"). During a multipoint conference session, the MCU can manage multiple endpoints at once, coordinate the video data processing of the multiple endpoints, and forward the flow of media streams among the multiple endpoints. The MCU can conduct group video conferences under the principle of mixing media streams, i.e. mixing and re-encoding participants' video conferencing streams in real time. For example, the MCU can create a picture-in-picture effect. The MCU in most applications includes a multipoint controller ("MC") and optionally one or more multipoint processors ("MPs"). The MCs can coordinate media stream processing parameters between endpoints and typically support the H.245 protocol. The MPs can process, mix and switch multimedia streams.

In contrast, a VCS often implements a multiplexing pattern of the data streams, which implies no transcoding. The VCS typically redirects the media streams of the video conference participants. The compression/decompression and media stream mixing functions are generally performed in the endpoint devices.

The network video conference unit 104 can service any conference topology, including a centralized conference, decentralized conference, or hybrid conference topology. Exemplary video conference units that can be modified as set forth herein include the ELITE 6000™, 6110™, 6120™, 5000™, 5105™, and 5110™ products of Avaya, Inc.

The first, second, third, . . . mth endpoints 108a-m can be any suitable devices for providing a user interface for a voice or video conference. Some of the endpoints can be capable of hosting the voice portion of the conference only or a part of the video conference (e.g., only display images of remote participants but not transmit an image of a local participant or only transmit an image of a local participant but not display images of remote participants) or all of the video conference (e.g., display images of remote participants and transmit an image of the local participant). The first and second endpoints at least capture and optionally display locally to the local participant images of remote participants. Examples of suitable devices include a cellular phone, tablet computer, phablet, laptop, personal computer, and purpose-built devices, such as the SCOPIA XT EXECUTIVE 240™, XT ENDPOINT™, XT1700™, XT4200™, XT4300™, XT5000™, XT Embedded Server™, XT7000, and XT Endpoint™ with embedded server products by Avaya, Inc. that can be modified as set forth herein.

The optional network video conference unit 104 and first, second, third, . . . nth endpoints 108a-m are connected by the network 112. The network 112 can be a local area network ("LAN"), a wide area network ("WAN"), a wireless network, a cable network, a telephone network, the Internet, and/or various other suitable networks in which a video conferencing system can be implemented.

Figure 2:
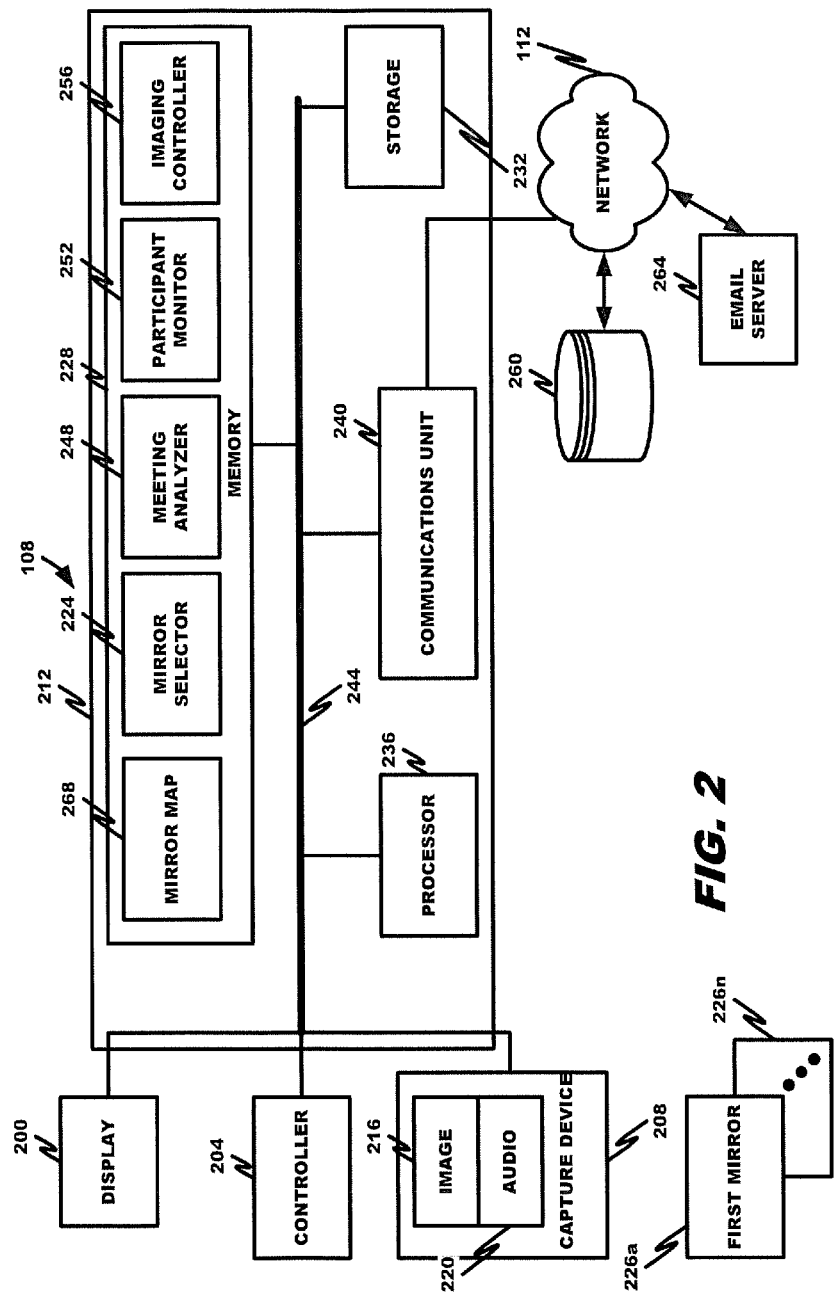
FIG. 2 is a block diagram depicting an endpoint configuration according to an embodiment of the disclosure.

With reference to FIG. 2, an exemplary endpoint is depicted. The exemplary endpoint 108 comprises a display device 200, a controller 204, a capture device 208, and a control unit 212.

The display device 200 can be any appropriate display or screen suitable to display an image stream received from the control unit 212. The display device 200 may display an image stream received at the control unit 212 from one of the remote video conferencing endpoints over the communications network 112. Alternatively, and/or additionally, the image stream received from the image capture device 208 may be displayed by the display device 200 and/or processed by the control unit 212 before transmission to the display device 200.

The controller 204 can be any type of input devices, such as a keyboard, a pointing device (e.g. mouse, trackball, pointing stick, etc.), a remote control unit or a touchscreen device enabling a participant of the video conferencing room to interact with the control unit 212.

The capture device 208 can include an image capturing device 216, such as one or more still or video cameras capable of capturing 2-dimensional or 3-dimensional image information, and an audio capturing device 220, such as one or more microphones. The image capturing device 216 captures and provides image streams to the control unit 212. The image capturing device 216 typically comprises one or more mechanical or digital Pan-Tilt-Zoom (PTZ) cameras. However, those skilled in the art will appreciate that other types of cameras may also be used. The audio capturing device 220 can comprise an array of microphones to capture and provide the audio streams to the control unit 212.

The control unit 212 generally comprises a display screen 224, a memory 228, a storage unit 232, a processor 236 and a communications unit 240. The control unit 212 can communicate (i.e. exchange audio and video information and/or any additional data), over the communications network 112, with the other video conferencing endpoints and the network video conference unit 104, access an enterprise database 260 comprising subscriber information, or interact with an enterprise email server 264 comprising subscriber email correspondence. This display device 200 can provide a command and control interface for the user.

The memory 228 can be any computer readable medium, such as a random access memory (RAM) or other dynamic storage device (e.g. dynamic RAM, static RAM, synchronous RAM, etc.) coupled to the bus 244 for storing information and instructions to be executed by the processor 236. Additionally, the memory 228 may be used to store temporary variables and/or other intermediate information during the execution of instructions by processor 236. It will be appreciated by those skilled in the art that the memory 228 may be a single memory or split into a plurality of memories. For example, a further memory may be provided such as a read only memory (ROM) or any other static storage (e.g. programmable ROM, erasable programmable ROM, and electrically erasable programmable ROM, etc.) coupled to the bus for storing static information and instructions for the processor 236.

The storage unit 232 can be a further computer readable medium, such as a magnetic hard disk, or a removable media drive (e.g. floppy disc drive, read-only compact disc drive, read/write compact disc drive, compact disc jukebox, tape drive, and removable magneto-optical drive), etc. coupled to the bus for storing other information and/or instructions.

The processor 236 can process any command received from a video conferencing user, triggered by the video conferencing endpoint 108 or received from the communications network 112 (e.g. from the network video conference unit 104 and/or from another video conferencing endpoint 108). In response to a received command, the processor 236 can retrieve and execute the relevant set(s) of instructions from one of the memories 228 and 232. Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture. Those skilled in the art will appreciate that the present disclosure is not limited to this single processor arrangement but that one or more processors in a multi-processor arrangement may be employed to execute the set(s) of instructions retrieved from one of the memories.

Finally, the communications unit 240 is generally a communication interface providing a two-way communication coupling between the video conferencing endpoint 108 and the communications network 112. The communications unit 240 can receive any type of data information from the different devices of the video conferencing endpoint 108 such as the display device 200, the controller 204, and the capture device 208 and pass the data information to the processor 236 for further processing and/or to other video conferencing endpoints of the video conferencing system 100 over the communications network 112. Also, the communications unit 240 can receive any additional data information received by a further device present in the video conferencing endpoint 108. The communication unit 139 can exchange (e.g. transmit and receive) any suitable type of data information with a plurality of devices coupled to the control unit 212 and exchange information with remote video conferencing endpoints 108 or the network video conference unit 104 of the video conferencing system 100 over the communications network 112.

The meeting area includes first, second, . . . nth mirrors 226a-n to provide additional image capture inputs for the endpoint. The mirrors are typically high resolution mirrors and can be stationary or movably mounted. When the mirrors are movably mounted, the position of any mirror is controlled by the mirror selector to provide a selected view of an object of interest. The mirrors can be located at selected locations in the meeting area to enable the endpoint 108 to capture selected images of meeting participants regardless of participant location in the meeting area or facing direction. The mirrors can be located proximal to or on a wall in front of the image capture device 208 to enable the image capture device 208 to capture an image of an object of interest positioned out of view of the camera, on a side wall in front of the image capture device 208 to provide a different view angle to a discussion between meeting participants, who are naturally looking at each other and away from the image capture device 208, on a ceiling to enable the image capture device 208 to view items on a conference room table, and on the conference room table itself to view items on the conference room table. The mirror(s) can be located at other locations in the meeting area depending on the application. The mirror(s) can provide for capture of an image from a viewpoint different than that of the image capture device.

Included in the memory 228 of the control unit 212 are a mirror selector 224, mirror map 268, meeting analyzer 248, participant monitor 252, and imaging controller 256.

The mirror selector 224 automatically selects a mirror as an image capture input for a selected object of interest according to a determined focal point of the meeting. For example, while the image capture device 216 captures a view of the entire meeting area, the mirror selector 224 can select a mirror as an image capture input, and the imaging controller 256 can extract the image captured by the selected mirror from the remainder of the captured image. This can be done by suitable techniques, such as digital cropping. The extracted captured image attributable to the selected mirror can be upscaled as set forth below to a same resolution, size, and scale as the objects captured directly by the image capture device 216.

The mirror map 268 can be an electronic map that maps or locates the first, second, . . . nth mirrors 226a-n relative to a selected physical point of reference in the meeting area and characterizes the mirrors. Each mirror is characterized by one or more of a corresponding set of coordinates relative to the selected point of reference, a mirror type (e.g., flat, curved (e.g., convex or concave), segmented, and the like), mirror size (e.g., height, width, reflective surface area, etc.), angle of the mirror relative to an optical axis of the image capture device 216, and meeting resource locations, or corresponding set of coordinates relative to the selected point of reference. This can be generated by manual input, such as by using a graphical user interface providing a display of the meeting area that is editable by the user to include mirrors, endpoint location, image and/or audio capture device location, and meeting resource locations. The mirror map 268 can also be generated by image processing to locate reflected images, such as by differences in captured object proportions. A remote user can also indicate the location of a mirror by a mouse click and, in response, the control unit need only find the edges around the selection. The map can also be recomputed for every move of the PTZ camera in respect to the new image that is obtained, and based on the knowledge of XYZ movement of the PTZ camera or on image processing or on both.

Once the location and spatial boundaries of each mirror is known and recorded in the mirror map 268, the control unit can cut the reflected image for each mirror and treat it as an additional captured video stream, with or without upscaling. Knowing the mirror spatial boundaries, image processing can correct easily distortion and create a natural rectangular image, even when the image capture device captures the mirror from different angles (such as on a wall, a ceiling, a desk, and the like).

The control unit can overlay the reflected image for a mirror with a previously selected image, such as a company logo, banner, message, or other static or dynamic image (such as a screen saver, landscape view, etc.). The reflected image can then be included in the video conference screen layout as an additional view. The remote user can choose to switch between views or present all views.

The meeting analyzer 248 can analyze the meeting parameters, content, and activity to determine an initial and in-progress focal point of the meeting. The meeting analyzer 248 typically considers various information sources in focal point determination. For example, the meeting analyzer 248 can access, via the enterprise database 260, electronic calendars of one or more participant subscribers to determine, from the Outlook™ meeting invitation, the meeting parameters (e.g., beginning and ending times, meeting duration, meeting attendee identities and locations, meeting attendee contact information (e.g., electronic addresses), identity of meeting organizer, enterprise hierarchy (or office or position) of the meeting participants, meeting subject, meeting agenda from the meeting notes, and meeting presentations or discussion topics from the attachments). The meeting analyzer 248 can access, via the email server 264, pre-meeting email threads among the communication devices of the participants regarding the meeting. Based on this information, the meeting analyzer 248 can employ natural language processing to determine, for instance, the organization or agenda of the meeting, such as who will be presenting or speaking, during what time interval, and about what topics, when the meeting is open for questions from other participants, and the like. The meeting analyzer 248 can track temporally the progression of the presenter through a presentation, such as a Microsoft Power Point™ presentation, and determine how many slides have been reviewed and/or how many slides have yet to be reviewed. With this information, text and speech recognition and biometric information can be used by the meeting analyzer 248 to identify audio cues as to the identity of the speaker, a current location in the meeting agenda, and the like.

The participant monitor 252 can acquire the facial images of each participant in the captured image using face detection techniques, acquire other object images in the captured image (such as a whiteboard, table, chair, and the like) using digital processing techniques, determine an identity of each acquired facial image by face recognition techniques using an identified biometric information of the participant, determine a spatial location of each participant relative to the capture device 208 and to one or more other participants such as by motion detection, determine an active speaker using speaker localization and a microphone array, determine a point of focus of one or more participants in the room by gaze detection, and the like. The participant monitor 252, using face detection techniques, microphone array analysis, or motion detection, can detect a participant entering or leaving the monitored communication session area, e.g., room.

The meeting analyzer 248 and participant monitor 252 commonly provide the determined information to the imaging controller 256, which can determine, based on rules and user input, which image should be provided to remote participant endpoints at any point in time during the communication session, or to define a set of optimal views for the video conferencing session identified by image processing and contextual analysis. The imaging controller 256, for instance, is able to identify and adjust the capture device (e.g., adjust the pan, tilt or zoom of a camera) and/or request the mirror selector 224 to select a mirror to enable the capture device to capture a selected optimal view of the meeting area or participant or object therein at a selected time. The imaging controller 256 can maintain the capture device 208 in a constant position and orientation but request the mirror selector 224 to select a mirror as image capture input for a selected object of interest and extract the captured image from the overall image captured by the image capture device 216. In this embodiment, the image capture device 208 captures an image of a substantial portion of the meeting area, including image(s) reflected by one or more mirror(s), and the imaging controller 256 extracts the desired image, whether indirectly captured by the camera via reflection or directly captured by the capture device 208, from the meeting area image. Alternatively, the imaging controller 256 can adjust the image capture device (e.g., adjust the pan, tilt or zoom of a camera) to focus on a mirror selected by the mirror selector 224 to provide an image capture input for a selected object of interest. By way of illustration, an optimal view could include capturing a dialog between participants or capturing a presenter standing near the screen. Other optimal views include whiteboard focus in which the whiteboard is in focus and centralized (e.g., from the view of the camera) in the captured image. Other optimal views will be appreciated by one of ordinary skill in the art.

While the discussion envisions the use of mirror and view selection based on meeting context, it is to be understood that mirror selection based on meeting context can be used by the system as a standalone image selection mechanism. To illustrate, the camera can capture a single view of the meeting area and, by varying the extracted image capture input (e.g., captured directly by the camera or indirectly by the camera via a selected mirror) capture objects of interest in the room while removing, from the single view, objects not of interest. This can enable the endpoint to maintain substantially eye contact between remote participants and a local participant, even when the local participant moves from one location to a next location or turns his or her head to gaze in a different direction.

Figure 9:
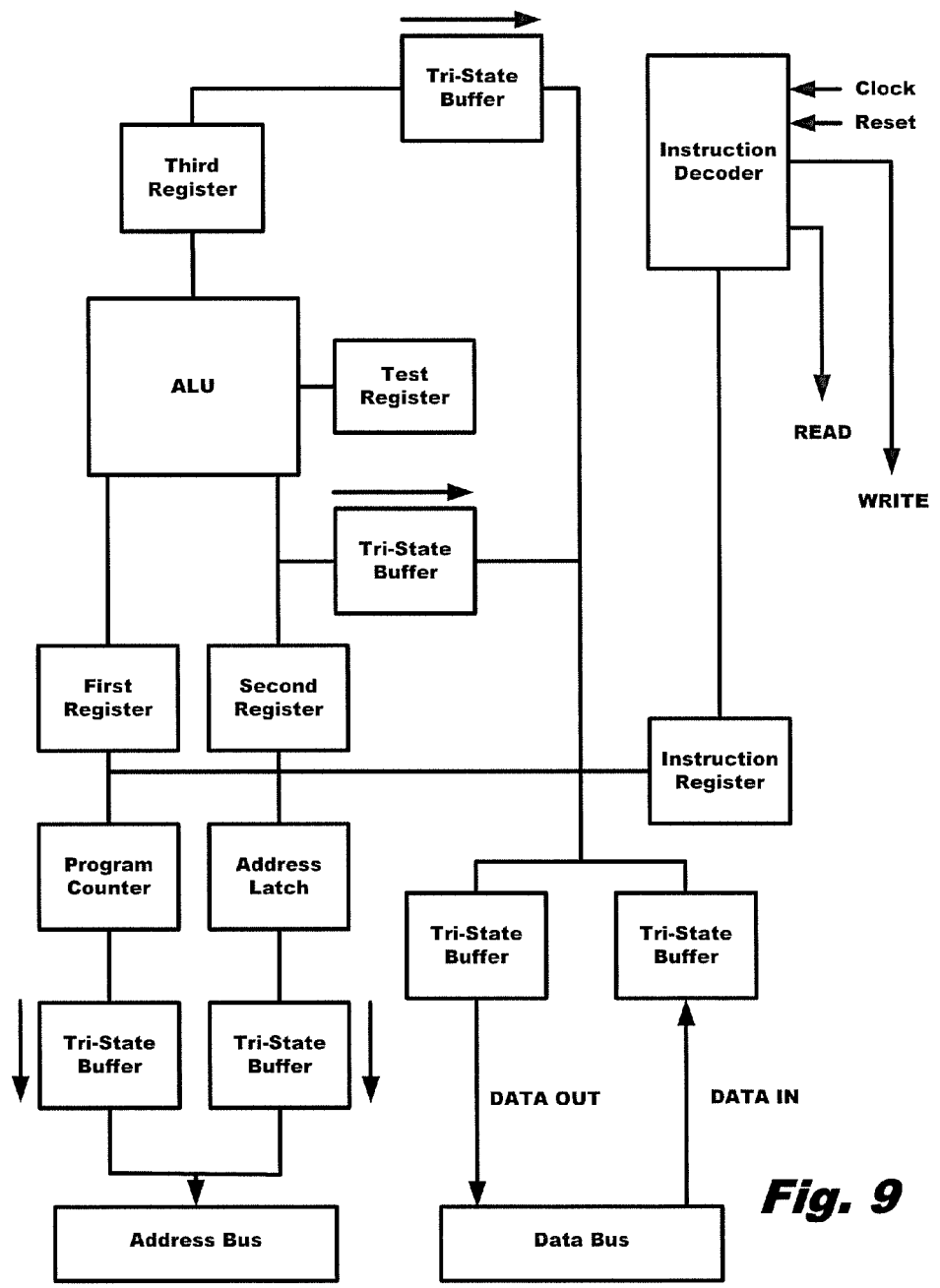
FIG. 9 is a block diagram of hardware for the control unit according to an embodiment.

With reference to FIG. 9, the control unit 212 can execute the meeting analyzer 248, participant monitor 252, mirror selector 224, and imaging controller 256 using an arithmetic/logic unit ("ALU"), which performs mathematical operations, such as addition, subtraction, multiplication, and division, machine instructions, an address bus (that sends an address to memory), a data bus (that can send data to memory or receive data from memory), a read and write line to tell the memory whether to set or get the addressed location, a clock line that enables a clock pulse to sequence the processor, and a reset line that resets the program counter to zero or another value and restarts execution. The arithmetic/logic unit can be a floating point processor that performs operations on floating point numbers. The control unit 212 further includes first, second, and third registers that are typically configured from flip-flops, an address latch, a program counter (which can increment by "1" and reset to "0"), a test register to hold values from comparisons performed in the arithmetic/logic unit, plural tri-state buffers to pass a "1" or "0" or disconnect its output (thereby allowing multiple outputs to connect to a wire but only one of them to actually drive a "1" or "0" into the line), and an instruction register and decoder to control other components. Control lines, in the verification system, from the instruction decoder can: command the first register to latch the value currently on the data bus, command the second register to latch the value currently on the data bus, command the third register to latch the value currently output by the ALU, command the program counter register to latch the value currently on the data bus, command the address register to latch the value currently on the data bus, command the instruction register to latch the value currently on the data bus, command the program counter to increment, command the program counter to reset to zero, activate any of the plural tri-state buffers (plural separate lines), command the ALU what operation to perform, command the test register to latch the ALU's test bits, activate the read line, and activate the write line. Bits from the test register and clock line as well as the bits from the instruction register come into the instruction decoder. The ALU executes instructions for image capturing device(s) and audio capturing device(s), including mirror selection, and display and playback of collected image and audio information.

Figure 3:
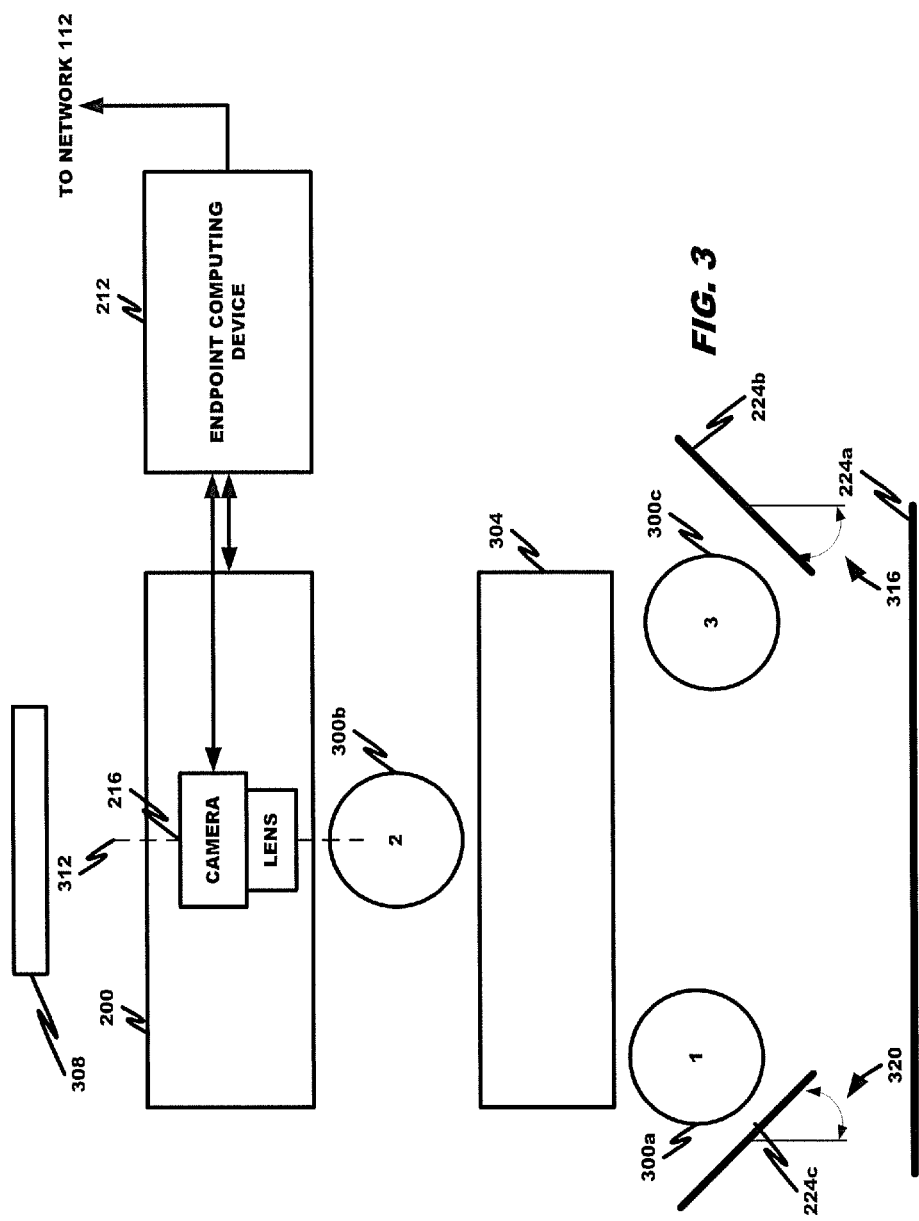
FIG. 3 is a block diagram an exemplary endpoint configuration during a video conferencing session according to an embodiment.

An example of a video conferencing communication session will be discussed with reference to FIGS. 2-3. The meeting room includes first, second, and third participants 300a, b, c, a conference table 304, a presentation surface 308 (such as a whiteboard or screen), and first, second, and third mirrors 224a,b, and c. For a stationary camera, such as a wide-angle digital camera, the first mirror 224a is located perpendicular to an optical axis 312 of the camera 216, the second mirror 224b is located at an acute angle 316 (typically 45 degrees) to the optical axis 312 of the camera, and the third mirror 224c is located at an acute angle 320 (typically −45 degrees) to the optical axis 312 of the camera. For a PTZ camera (having an optical axis that changes position with PTZ movements), the first mirror 224a is located centrally behind the table 304 and the second and third mirrors 224b and c are located on either side of the first mirror 225a (with the planes of the second and third mirrors being transverse to the plane of the first mirror). The participant monitor 252 detects the faces of each of the first, second, and third participants 300a-c, the table 304, and presentation surface 308, and first, second, and third mirrors 224a,b, and c and identifies each of the first, second, and third participants 300a-c. At the beginning of the video conferencing communication session, the imaging controller 256 selects as the optimal view a view having the first, second, and third participants 300a-c in frame, in focus and centralized with reference to the captured image, with reflected images from the first, second and third mirrors providing extra image inputs. One or more of the reflected images can be in the default view because the reflected images can contain important information not in directly captured images.

The imaging controller 256 adjusts the pan, tilt, and zoom of the camera 216 to produce this view. The overall image is modified to remove any reflected image from the second and third mirrors 224b and c. After the video conferencing communication session commences and after a selected time interval has elapsed, the second participant 300b becomes the active speaker. The imaging controller 256, in response, selects as the optimal view a view having the face of the second participant in frame, in focus and centralized, with neither the first nor third participant 300a and c in frame. To provide the view, the mirror selector selects input from any of the first, second, or third mirrors 224a-c (depending on which provides a better facial image). The first mirror 224a is selected when the second participant's face is facing towards the first mirror 224a, the second mirror 224b is selected when the second participant's face is facing towards the second mirror 224b, and the third mirror 224c is selected when the second participant's face is facing towards the third mirror 224c. The imaging controller 256, optionally adjusts the pan, tilt, and zoom of the camera 216 towards the selected mirror to produce this view. Alternatively, the imaging controller 256, optionally does not adjust the pan, tilt, and zoom of the camera 216 but simply extracts the reflected image from the selected mirror from the overall image of the meeting area and provides the extracted image to remote participants. After the selected time interval has elapsed, the second participant 300b stands and walks to the presentation surface 308 positioned behind the camera. The imaging controller 256, in response, selects as the optimal view a view having the presentation surface and second participant in frame, in focus and centralized, with neither the first nor third participant 300a and c in frame. To provide the view, the mirror selector selects input from the first mirror 224a. The imaging controller 256, optionally adjusts the pan, tilt, and zoom of the camera 216 towards the first mirror to produce this view. Alternatively, the imaging controller 256 optionally does not adjust the pan, tilt, and zoom of the camera 216 but simply extracts the reflected image from the selected mirror from the overall image of the meeting area and provides the extracted image to remote participants. Later in the meeting and after the selected time interval has again passed, the first participant 300a becomes the active speaker, and the imaging controller 256, in response, selects as the optimal view a view having the first participant 300a in frame, in focus and centralized in the captured image, with neither the second nor third participant 300b and c in frame. The imaging controller 256 notifies the mirror selector of the optimal view, and the mirror selector determines that no mirror input is required. The imaging controller 256 therefore adjusts the pan, tilt, and zoom of the camera 216 to directly capture the image of the first participant and produce this view. Later in the meeting and after the selected time interval has again passed, the first participant 300a starts presenting, through web conferencing software such as Avaya Aura Conferencing™, a PowerPoint™ presentation having 10 slides. The imaging controller 256, due to the number of slides and/or tracking the slide transitions from slide to slide, determines that the optimal view is the view having the first participant 300a in frame, in focus and centralized in the captured image, with neither the second nor third participant 300b and c in frame. The imaging controller 256 further determines that all questions are to be asked at the end of the presentation and, when the presentation ends, selects as the optimal view a view having the first, second, and third participants 300a-c in frame, in focus and centralized in the captured image, with minimal background in the captured image. The imaging controller 256 notifies the mirror selector of the optimal view, and the mirror selector determines that no mirror input is required. The imaging controller 256 therefore adjusts the pan, tilt, and zoom of the camera 216 to directly capture the image of the first participant and produce this view. Alternatively, the camera can generate several views of the objects or participants in the room, with different of the images being in different sub frames of the video layout.

In another example, a participant is presenting on a presentation surface, such as a screen. There are two ways to capture the presentation for provision to remote participants. A first way is by sampling in a presentation mode the content presented by the presentation surface, typically at a sampling rate of 5 frames per second or less. A second way is by the camera capturing a video of the presentation in real time, which typically has a sampling rate of at least 30 frames/second or even as high as 60 frames/second. This requires the camera to have a direct view of the presentation surface, which is typically located behind the camera. The former way is not effective when the presentation content is a video or a Power Point™ animation. By using a mirror, such as the first mirror 224a, the imaging controller is able to capture the presentation content at the higher sampling rate of the camera as is displayed on screen 308.

Figure 4:
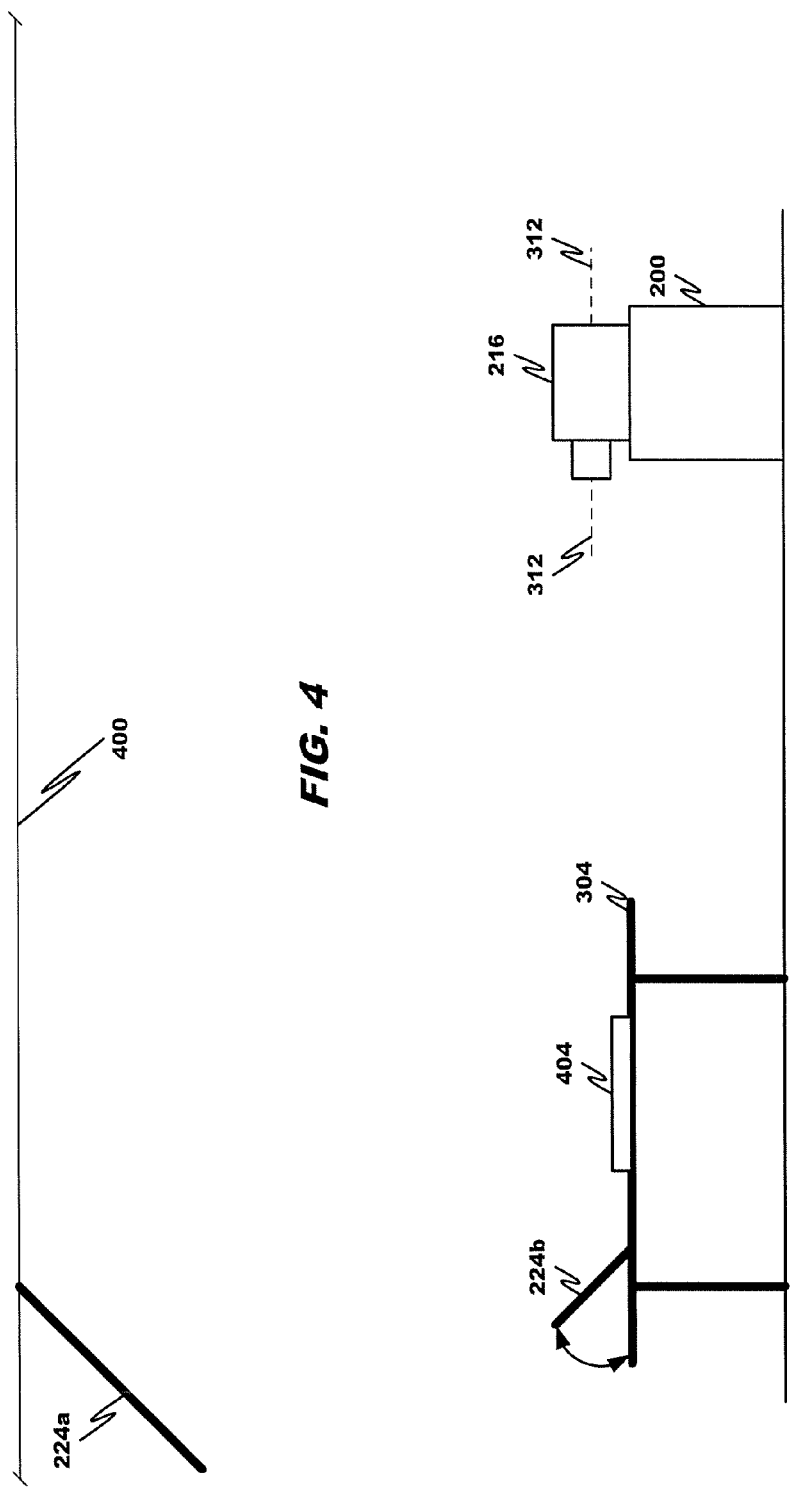
FIG. 4 depicts an exemplary endpoint during a video conferencing session according to an embodiment.

A further example of a video conferencing communication session will be discussed with reference to FIGS. 2 and 4. The meeting room includes a table 304 and first and second mirrors 224a and b. The first mirror 224a is located on a ceiling 400 of the meeting area and at an acute angle (typically 45 degrees) relative to an optical axis 312 of the camera 216 (when the camera is stationary or in a substantially fixed position). The second mirror 224b is located on the table 304 and at an obtuse angle (typically from about 125 to 135 degrees) relative to an optical axis 312 of the camera 216. When the object of interest 404 is an item on the table 304, such as a computer screen, notebook, paper, publication, or other object, the mirror selector can select either the first or second mirrors 224a-b depending on which mirror provides a more optimal reflected view of the object. The imaging controller 256 adjusts the pan, tilt, and zoom of the camera 216 to produce this view. The overall image is modified to remove any reflected image from the second and third mirrors 224b and c. The reflected image can be placed in a frame of a screen layout in addition to another participant, such as active speaker, or be converted into a document and sent by another communication channel to one or more participants.

As shown by the above description, the changes in camera views are not automatic after every active speaker change or with every presentation surface demonstration. The transition between views is typically contingent upon passage of the selected time interval since the last view change and/or last detected speaker change. For example, if a participant speaks and/or works on the presentation surface for a period longer that X minutes, then the imaging controller 256 determines that it is worth adjusting the camera. Other factors can also impact this decision, such as speaker identity.

Figure 10:
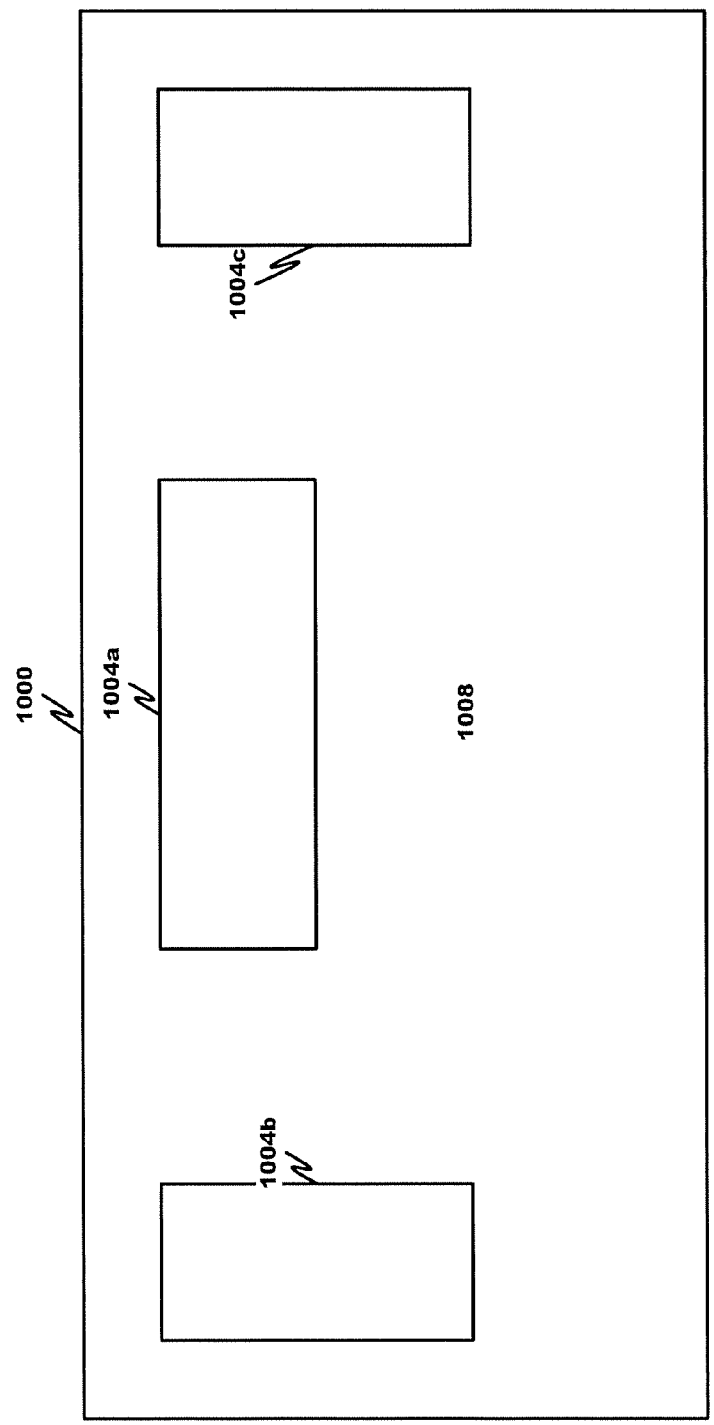
FIG. 10 presents a captured image according to an embodiment.

FIG. 10 illustrates an image capture input 1000 of the camera 216. Reflected images 1004a-c correspond respectively to first, second, and third mirrors 224a, b, and c, and the remainder 1008 of the image capture input 1000 is captured directly by the camera 216 without reflected image information. While the reflected images are shown as rectangles, it is to be appreciated that they may be any quadrangle, or four-sided polygon with four angles (which can be equal or unequal in any combination), due to the affine or projective transformation performed on the reflected image. When the overall image is selected as the optimal view, the reflected images 1000a-c can be replaced by known techniques, such as background replacement techniques in PHOTOSHOP™ and other applications. The reflected images, when not selected, can be replaced by any desired content including company logos and other synthetically generated backgrounds. When any of the reflected images 1004a-c is selected as the optimal view, they are extracted, such as by cropping and upscaled and expanded to a scale similar to the objects in the directly captured portion 1008 of the image.

Figure 8:
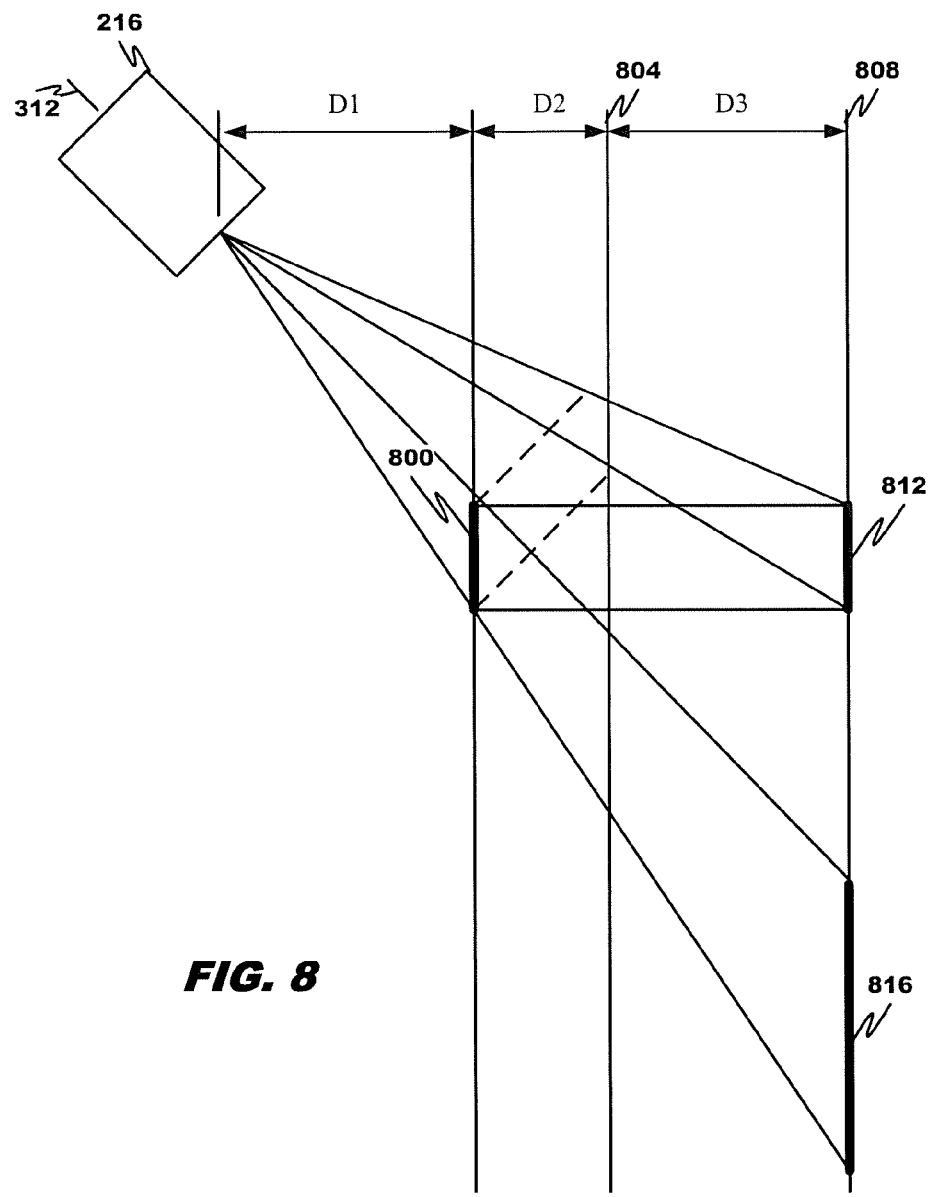
FIG. 8 is a block diagram depicting application of the Snell Theorem in the system of this disclosure.

Upscaling and expansion will be discussed with reference to FIG. 8 (which is not drawn to scale). In FIG. 8, the object 800 is positioned one a first side of the camera and the image 816 in the virtual surface 808 is on the other side of the camera. D1 is the distance from the object 800 to the camera lens; D2 is the distance from the camera 216 to the mirror 804; D3 is the distance from mirror to the virtual surface 808; the image 812 is the reflected image; and the image 816 is the image in the virtual surface 808. Angle α 1104 is the angle of view for the image while angle β 1100 is the angle of view for the image. Under Snell's law, a dimension of the object 800, such as the length or width, is the same as the corresponding dimension of the image 816 in the virtual surface, Based on triangle similarity, the ratio between the tangent functions of the angle of view of the object on one hand and of the image on the other hand is proportional to the ratio of D1 over the sum of D2 and D3. The resolution of an image taken by a camera is proportional to its angle of view. Therefore, looking at the camera image, the ratio between the object dimension and the mirror's image dimension is equal to the ratio between the angles of views: Angle α over angle β. For small angles the tangent function approximate the angle (in radians). Therefore, for small angles, the ratio between the camera image of the object and the camera image of the reflection is proportional to the ratio of D1 over the sum of D2 and D3. Using these relationships, a selected dimension of the reflected image of an object can be enlarged to the corresponding dimension of the original image by dividing the dimension of the reflected image by the ratio set forth above. The same relationships apply to a reflected image of a selected object captured by a first mirror, which is then captured by a second mirror by reflectance off the first mirror.

Figure 5:
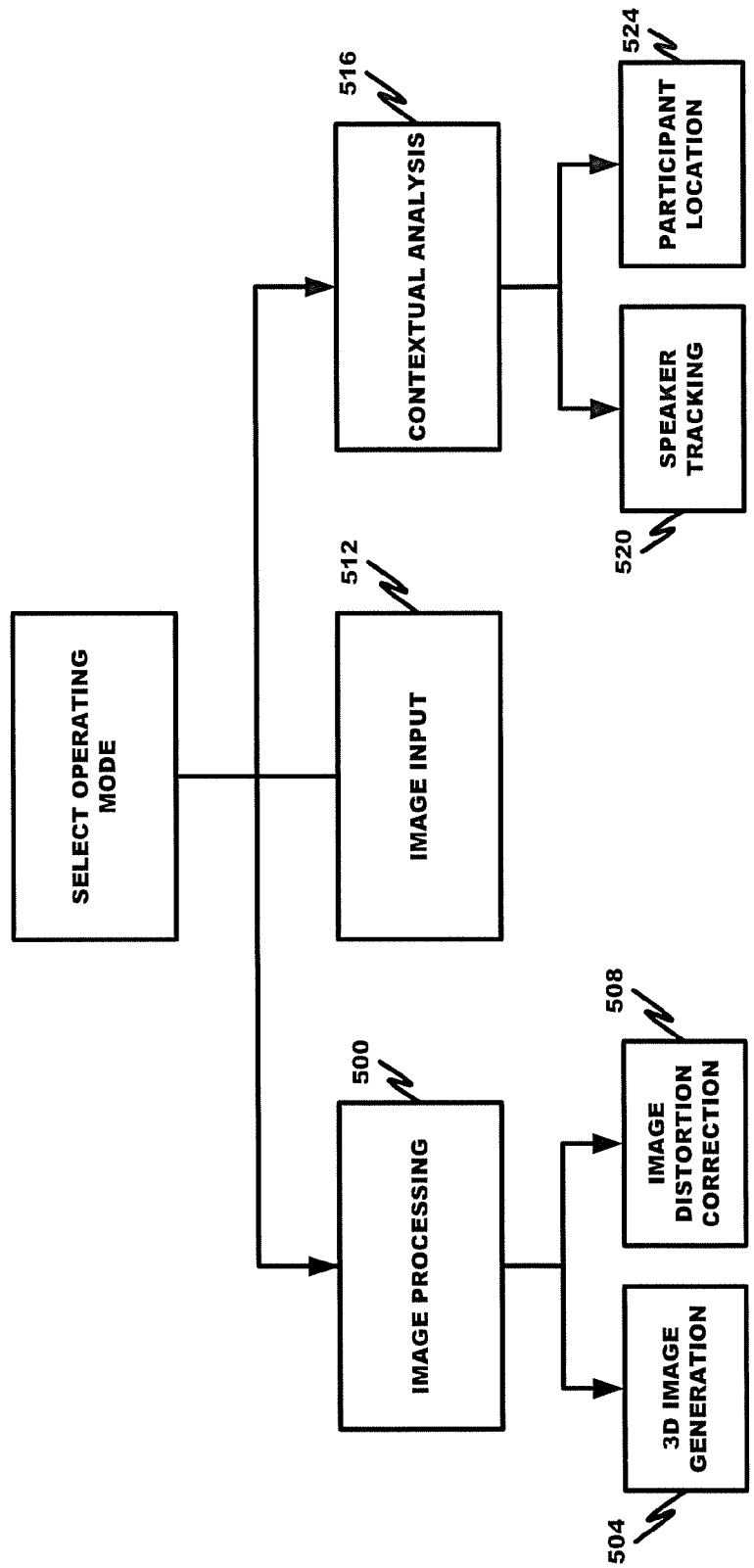
FIG. 5 is a block diagram depicting various operating modes for the video conferencing endpoint according to an embodiment.

FIG. 5 illustrates that a user can select from a number of different operating modes for the conferencing system 100.

In a first operating mode, referenced as the image input mode 512, the conferencing system 100 executes the mirror selector 224 to assist the imaging controller 256 in selecting an optimal view, as discussed above.

In a second operating mode referenced as the image processing mode 500, the conferencing system 100 can either generate in a first sub-mode 504 a 3D image or perform, in a second sub-mode 508, image distortion correction.

In the first sub-mode, the imaging controller 256, with reference to FIG. 10, uses multiple two-dimensional image inputs, such as from the first, second, and/or third reflected images 1004a-b and/or the directly acquired image of the same objects of interest to generate a three-dimensional image. The two selected two-dimensional images of the selected object of interest are projected superimposed onto a common screen through different polarizing filters. The participant viewers typically (but are not required to) wear eyeglasses which also contain a pair of polarizing filters oriented differently (clockwise/counterclockwise with circular polarization or at 90 degree angles, usually 45 and 135 degrees, with linear polarization). As each filter passes only that light which is similarly polarized and blocks the light polarized differently, each eye sees a different image. This can be used to produce a three-dimensional effect by projecting the same image of the captured object of interest into both eyes, but depicted from slightly different perspectives (such as from the perspectives of two mirrors or a mirror and the directly captured camera image).

In the second sub-mode, the imaging controller 256 uses one or more reflected images of an object of interest, along with a primary reflected or directly captured image of the object of interest, to perform error correction, such as image distortion, in the primary reflected or directly captured image of the object of interest, thereby providing a clearer view of the object of interest. Examples of image distortion include chromatic aberrations, barrel distortion, pincushion distortion, and mustache distortion. Techniques for correcting errors in captured images are well known, such as Brown's distortion model, calibrated systems, Photoshop™, and the like. The imaging controller 256 can further use one or more reflected images of an object of interest to correct distortion in an image reflected by a non-planar mirror, such as a convex or concave or segmented mirror. Such mirrors will provide reflected images with variable concentrations or densities of image information over the area of the reflected image.

In a third operating mode referenced as the contextual analysis mode 516, the conferencing system 100 can either generate in a first sub-mode 520 speaker tracking or in a second sub-mode 524, participant location.

In the first sub-mode 520, the imaging controller performs speaker tracking by face detection techniques using digital processing techniques of directly captured and/or reflected images. A face detection algorithm produces a rectangle around the face. An example of a face detection algorithm is the Viola-Jones or KLT detection algorithm. The rectangle is typically tight enough in size that it can be considered as the face size, with some statistical variance that can be taken into consideration when estimating head/hair size. Face detection algorithms normally perform inside a sliding window of a specific size. Once face detection captures the faces of each participant, the imaging controller tracks movement of the lips of each of the participants. This is done by using a selected shape, texture, or color of a lip of the detected face for tracking. A histogram-based tracker can use a CAMShift algorithm, which provides the capability to track an object using a histogram of pixel values. The use of directly captured and reflected images of a participant can enable the imaging controller to track lip movement of the participant as he or she turns his or her head or moves around the meeting area.

In the second sub-mode 524, the imaging controller identifies a location of each participant by image processing using directly captured and/or reflected images. This can be done by face detection on each participant followed by locating the participant in the meeting area relative to a selected spatial coordinate system. Using multiple images, such as the directly captured and reflected images, can enable the participant to be located not only along the X and Y axes in the image plane but also along the Z axis (or the distance of the participant from the camera lens). This spatial information can be used by any of the other operating modes, such as by 3D image generation 504 to provide depth information in connection with three-dimensional image generation and speaker tracking 520 to identify spatially where the active speaker is relative to the camera.

Figure 6:
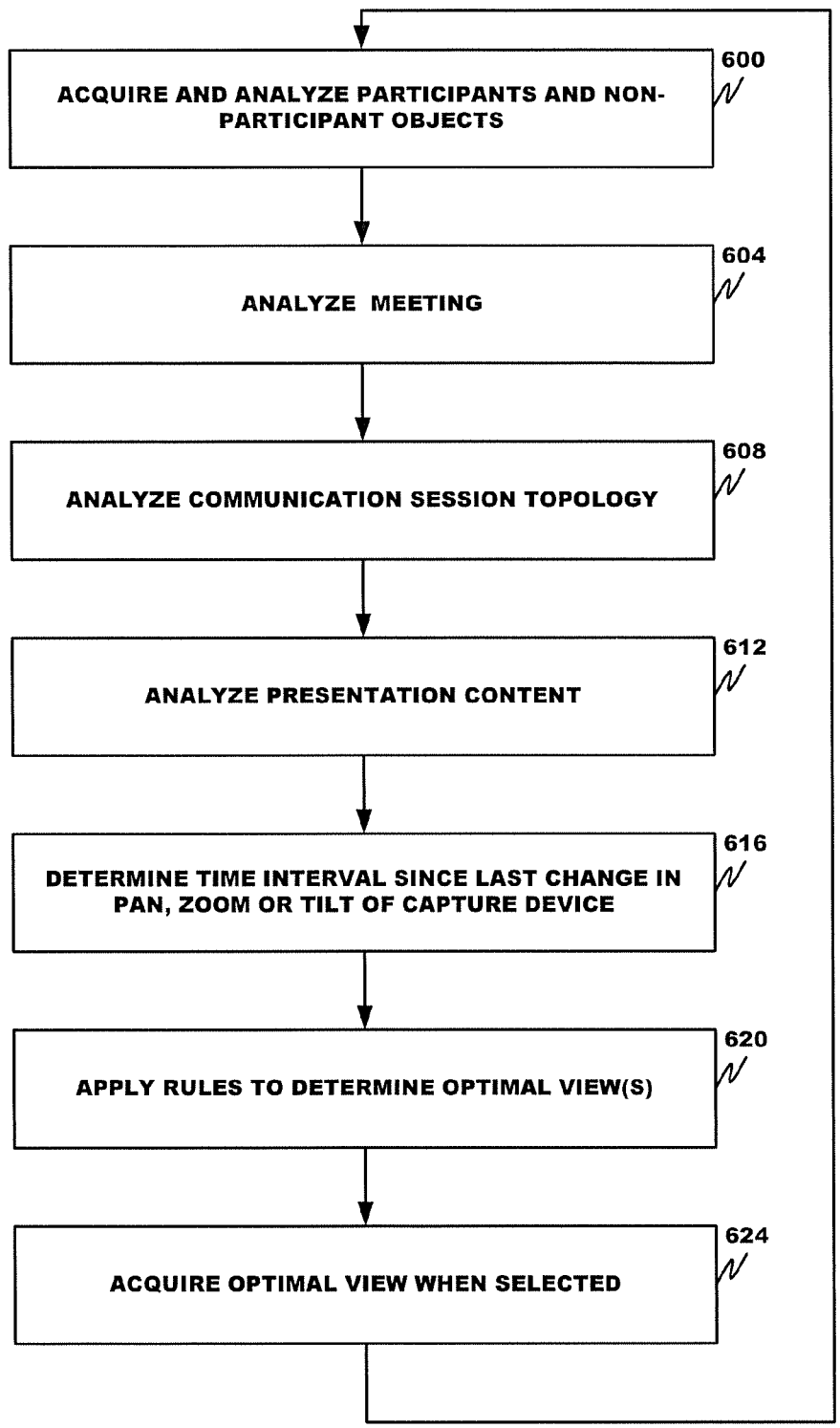
FIG. 6 is a flow chart depicting an image capture device control logic according to the embodiment.

The operation of the control unit 212 will now be described with reference to FIGS. 2 and 6.

In step 600, the participant monitor 252 acquires and analyzes participants and non-participant objects of interest in the monitored area for the communication session. It determines where participants are seated (such as by the participant location sub-mode 524), a facing direction of each participant (such as by the participant location submode 524), what objects are in the room (such as whiteboard, table, and projector screen), and whether there are participants seated outside the field of view of the camera. The monitor 252 further determines whether there have been participant changes since the last image acquisition and analysis. Participant changes, for instance, include a new participant entering the room, a participant leaving the room, a participant moving to a seating location outside the field of view of the image capture device, and a new active speaker. The identity and position of the active speaker can be identified by the participant monitor operating in the speaker tracking sub-mode 520 and/or by a microphone array.

In steps 604, 608, and 612, the meeting analyzer 248 analyzes the meeting, communication session topology, and presentation context. The meeting analysis typically includes, for instance, analysis of the electronic calendars and email threads of one or more participant subscribers to determine the meeting parameters, and the presentation contextual analysis includes, for example, key word identification to identify, by text-to-speech or speech-to-text analysis of the communication session conversation, the current focal point(s) of the meeting. The communication session topology refers to the electronic addresses, capabilities, and preferences of the endpoints 108 to the communication session and the network video conference unit 104.

In step 620, the imaging controller 256 applies rules to determine the optimal view(s) based on the input of the participant monitor 252 and meeting analyzer 248. The optimal views are selected based upon the current meeting state, as determined by the input, and timing of the last displayed image change. The imaging controller identifies points in time where the user experience benefits more from changing the view to be displayed by the remote endpoints than it would be disturbed by moving the camera or otherwise changing the view. Examples of times where the user benefit from the view change outweighs the user distraction include the start of the video conference, at selected points in time during a long video conference, and the like. The imaging controller 256 can make as many view changes in the course of a single meeting as desired without compromising user experience. Mirrors can be used to switch between active speakers which typically occurs within 1.5 seconds of a new participant beginning to speak. Switching between mirror sources and a camera source commonly does not degrade the experience in the same way as changing a PTZ camera position and can therefore occur an unlimited number of times. Where a participant has moved to a seat outside the field of view of the camera or a new participant has entered the room and selected a seat outside the field of view, the imaging controller 256 may elect to adjust the view in response to the participant entry or relocation or only once that participant starts speaking.

Different participant speakers can have different thresholds for view change from a first view to a second view. For example, the manager, when speaking, can have a lower threshold for view change from a first view not focused on the manager to a second view focused on the manager than a similar view change for another participant, when speaking. A higher level manager, when speaking, can have a lower threshold for view change from a first view not focused on the manager to a second view focused on the manager than a similar view change for a lower level employee, when speaking. Stated differently, hierarchical ranking of participants within an enterprise management structure can be used to determine a corresponding threshold for view change from a first view not focused on the participant to a second view focused on the participant when the participant starts speaking.

Mirrors can be used to generate several views of a common meeting area using a common camera. A best view for example would be a view of all participants selected from several sources including both the direct view of the camera and indirect camera views enabled by the mirrors. If a participant appears several times in all sources, the best appearance is selected and the remaining views are eliminated or not used. In another option, the sitting arrangement can be maintained to preserve gaze direction. In yet another option, one sub frame is allocated for each participant, similar to the desktop appearance, with the best view of each participant, whether directly captured by the camera or indirectly captured using a mirror, being selected for the corresponding sub frame.

In step 624, the control unit 212, when appropriate, commands the pan, tilt or zoom of the camera to be changed and/or the mirror selector to select a mirror and/or camera and/or partial or complete images and/or partial sources for a reflected image to implement the new views. The speed of the changes can be carefully controlled to avoid participant irritation.

The control unit 212 then returns to and repeats the above steps after a selected time interval has passed in the video conferencing communication session.

Figure 7:
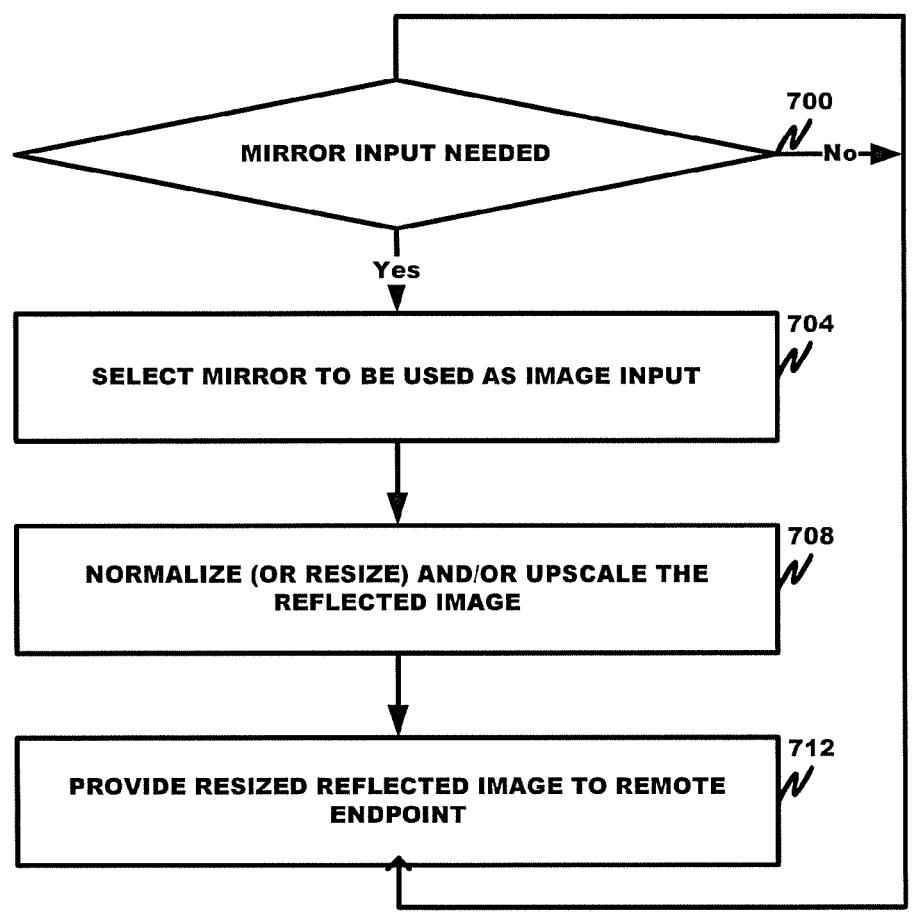
FIG. 7 is a flow chart depicting image processing logic according to the embodiment.

A further operation of the control unit 212 will now be described with reference to FIGS. 2 and 7.

In decision diamond 700, the capture device 208 determines whether or not the imaging controller has requested the mirror selector to select a reflected image satisfying specified requirements, such as a view of an object of interest. This can be done by specifying which objects of interest (e.g., participant(s)) are to be in the image. The mirror selector can determine, with input from the participant monitor, a facing direction of the specified participant(s).

In step 704, the mirror selector, for a selected object, selects a mirror and reflected image to be used as image input. The selected reflected image typically provides a view of the object of interest that provides an optimal or near optimal degree of eye contact with remote participants.

In step 708, the imaging controller normalizes (or resizes), transforms, and optionally upscales the reflected image of the object of interest. The transformation transforms the image from a first quadrangle into a second quadrangle typically using affine and/or projective transformation. As will be appreciated, affine transformation is a linear mapping method that preserves points, straight lines, and planes. Sets of parallel lines commonly remain parallel after an affine transformation. The affine transformation technique is typically used to correct for geometric distortions or deformations that occur with non-ideal camera angles. Projective transformation maps lines to lines (but does not necessarily preserve parallelism). Any plane projective transformation can be expressed by an invertible 3×3 matrix in homogeneous coordinates; conversely, any invertible 3×3 matrix defines a projective transformation of the plane. Projective transformations (if not affine) are not defined on all of the plane, but only on the complement of a line (the missing line is "mapped to infinity"). The primary difference between these two transformations is in the last line of the transformation matrix. For affine transformations, the first two elements of the line are zeros. This leads to different properties of the two operations, namely the projective transformation does not preserve parallelism, length, and angle (but preserves collinearity and incidence) and since the affine transformation is a special case of the projective transformation, it commonly has the same properties but, unlike projective transformation, preserves parallelism.

In step 712, the imaging controller provides the resized reflected image of the selected object to the remote endpoint(s).

The mirror selector then returns to decision diamond 700 to await a next request by the imaging controller.

Any of the steps, functions, and operations discussed herein can be performed continuously and automatically.

The exemplary systems and methods of this disclosure have been described in relation to video conferencing communication sessions. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In one embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A video-enabled communication system, comprising:
    a control unit, coupled with a camera, the camera acquiring an image of an object of interest during a video communication session, wherein the control unit comprises:
    a processor; and
    a computer readable medium comprising a mirror selector that causes the processor to select, from among multiple possible images in multiple mirrors that can be or have been captured by the camera, a reflected image of the object of interest for provision to a remote endpoint for display to another participant, wherein the reflected image is a reflection of the object of interest in at least one of the multiple mirrors having a line-of-sight to the camera.

2. The system of claim 1, wherein the at least one of the multiple mirrors is positioned transverse to an optical axis of the camera, wherein the processor bases the reflected image selection on information describing a local participant and/or context of the video communication session and wherein the processor, at a first time, selects a non-reflected image of the object of interest captured by the camera for provision to the remote endpoint and, at a second time, selects the reflected image of the object of interest to provide to the remote endpoint.

3. The system of claim 2, wherein the object of interest is a local participant, wherein, at the first time, the local participant is facing the camera and, at the second time, the local participant is facing the at least one of the multiple mirrors.

4. The system of claim 1, wherein the processor, at a first time, selects a non-reflected image of the object of interest captured by the camera for provision to the remote endpoint and, at a second time, selects the reflected image of the object of interest to provide to the remote endpoint, wherein the camera is a wide angle and high resolution digital camera, and wherein the non-reflected image and reflected image are extracted, at different times, from image information captured by a field of view of the camera at common pan, tilt, and zoom settings.

5. The system of claim 1, wherein the processor controls a pan, tilt, or zoom of the camera based on an electronic mirror map for the multiple mirrors comprising one or more of a mirror location defined by set of spatial coordinates, a mirror type, mirror size, and angle of a mirror relative to an optical axis of the camera and wherein the object of interest is a presentation on a presentation surface.

6. The system of claim 4, wherein the processor, at the first time, substitutes a selected image for the reflected image in the image information captured by the field of view of the camera.

7. The system of claim 1, wherein the processor upscales and/or enlarges the reflected image of the object of interest to resemble a size of the object of interest in a non-reflected image captured by the camera, wherein the object of interest is an item on a table or desk, and wherein the at least one of the multiple mirrors is positioned on a horizontal surface of the table or desk to reflect, for capture by the camera, the reflected of the item.

8. A method for controlling a camera during a video communication session, comprising:
    selecting, by a processor, from among multiple possible images that can be or have been captured by the camera, a reflected image of an object of interest for provision to a remote endpoint for display to another participant, wherein the reflected image is a reflection of the object of interest in a mirror having a line-of-sight to the camera;
    selecting, by the processor, at a first time, a non-reflected image of the object of interest captured by the camera for provision to the remote endpoint;
    selecting, by the processor, at a second time, the reflected image of the object of interest to provide to the remote endpoint, wherein the camera is a wide angle and high resolution digital camera and wherein the non-reflected image and reflected image are extracted, at different times, from image information captured by a field of view of the camera at common pan, tilt, and zoom settings; and
    providing, by the processor during the video communication session, the reflected image to the remote endpoint.

9. The method of claim 8, wherein the mirror is positioned transverse to an optical axis of the camera, wherein the processor bases the reflected image selection on information describing a local participant and/or context of the video communication session.

10. The method of claim 9, wherein the object of interest is a local participant, and wherein, at the first time, the local participant is facing the camera and, at the second time, the local participant is facing the mirror.

11. The method of claim 8, further comprising:
    controlling, by the processor, a pan, tilt, or zoom of the camera based on an electronic mirror map comprising one or more of a mirror location defined by set of spatial coordinates, a mirror type, mirror size, and angle of the mirror relative to an optical axis of the camera and wherein the object of interest is a presentation on a presentation surface.

12. The method of claim 8, wherein the processor, at the first time, substitutes a selected image for the reflected image in the image information captured by the field of view of the camera.

13. The method of claim 8, wherein the processor upscales and/or enlarges the reflected image of the object of interest to resemble a size of the object of interest in a non-reflected image captured by the camera, wherein the object of interest is an item on a table or desk, and wherein the mirror is positioned on a horizontal surface of the table or desk to reflect, for capture by the camera, the reflected image of the object.

14. A video-enabled communication system, comprising:
a processor, coupled with a camera, the camera acquiring an image of an object of interest during a video communication session; and
a computer readable medium, coupled with the processor, comprising instructions that cause the processor to select a reflected image of the object of interest for use in providing image information to a remote endpoint for display to another participant, wherein the reflected image is a reflection of the object of interest in a mirror having a line-of-sight to the camera and wherein the processor extracts the reflected image from a common image captured by the camera, the common image including a non-reflected image of an object other than the object of interest.

15. The system of claim 14, wherein the reflected image is used as an input to generate a three-dimensional image of the object of interest and wherein the image information comprises the three-dimensional image.

16. The system of claim 15, wherein the processor superimposes, on the reflected image, a second image of the object of interest to generate the three-dimensional image and wherein the reflected image and second image of the object of interest are captured at a same time by the camera.

17. The system of claim 14, wherein the processor uses the reflected image to correct image distortion in the image information.

18. The system of claim 14, wherein the object of interest is a participant and wherein the processor uses face detection and motion detection analysis of the reflected image to determine that the object of interest is an active speaker.

19. The system of claim 14, wherein the image information comprises the reflected image.

20. The system of claim 1, wherein the processor uses the reflected image to correct image distortion in the image information.

* * * * *